United States Patent
McGee et al.

(10) Patent No.: US 11,554,791 B2
(45) Date of Patent: Jan. 17, 2023

(54) TEST SYSTEM AND METHOD FOR AUTONOMOUS MACHINES

(71) Applicant: Caterpillar Paving Products Inc., Brooklyn Park, MN (US)

(72) Inventors: Robert J. McGee, Peoria, IL (US); Kyle D. Hendricks, Saint Francis, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 134 days.

(21) Appl. No.: 16/811,886

(22) Filed: Mar. 6, 2020

(65) Prior Publication Data

US 2021/0276590 A1 Sep. 9, 2021

(51) Int. Cl.
*B60W 60/00* (2020.01)
*G05D 1/00* (2006.01)
*G06V 20/56* (2022.01)

(52) U.S. Cl.
CPC .... *B60W 60/0011* (2020.02); *B60W 60/0025* (2020.02); *G05D 1/005* (2013.01); *G05D 1/0016* (2013.01); *G06V 20/56* (2022.01); *G05D 2201/0202* (2013.01)

(58) Field of Classification Search
CPC ......... B60W 60/0011; B60W 60/0025; G05D 1/0016; G05D 1/005; G05D 2201/0202; G06K 9/00791
See application file for complete search history.

(56) References Cited

U.S. PATENT DOCUMENTS

| | | | |
|---|---|---|---|
| 6,493,616 B1 | 12/2002 | Rossow et al. | |
| 7,092,848 B2 | 8/2006 | Hoff et al. | |
| 8,924,067 B2 | 12/2014 | Halder et al. | |
| 9,471,059 B1* | 10/2016 | Wilkins | G05D 1/0094 |
| 10,093,355 B1* | 10/2018 | Wang | E02F 9/2045 |
| 10,466,705 B1* | 11/2019 | Garg | G05D 1/0212 |
| 2004/0125011 A1* | 7/2004 | Kumon | G01S 13/931 342/70 |
| 2007/0021895 A1 | 1/2007 | Brandt et al. | |
| 2018/0254903 A1* | 9/2018 | Bardelski | H04L 9/0891 |
| 2018/0323453 A1* | 11/2018 | Arisetty | B60L 58/34 |
| 2019/0367081 A1* | 12/2019 | Hwa | H04L 9/3242 |
| 2021/0149403 A1* | 5/2021 | Ready-Campbell | G05D 1/0027 |

FOREIGN PATENT DOCUMENTS

KR 10-1922222 B1 2/2019

* cited by examiner

*Primary Examiner* — Thomas Ingram
(74) *Attorney, Agent, or Firm* — Lee & Hayes, P.C.

(57) ABSTRACT

A test system includes a master electronic control module (ECM) configured to receive user input for performing a test action. The master ECM determines one or more subsystem ECMs associated with the requested test action and a sequence of operations to be controlled by the subsystem ECMs to perform the requested test action. The master ECM provides instructions to the subsystem ECMs to perform the operations, along with parameters for those operations. The master ECM may determine whether a test action is appropriate to perform, based on sensor data, before instructing subsystem ECMs to perform the operations of the test action.

20 Claims, 8 Drawing Sheets

TEST SYSTEM AND METHOD FOR AUTONOMOUS MACHINES

TECHNICAL FIELD

The present disclosure relates to testing of machines. More specifically, the present disclosure relates to testing of machines, such as construction machinery, that can operate autonomously or semi-autonomously.

BACKGROUND

Machines, such as cold planers, haul trucks, asphalt pavers, compaction machines, excavators, wheel loaders, and other machines are frequently employed for paving, construction, mining, and other activities. For example, compaction machines are used for compacting soil, gravel, fresh laid asphalt, and other compactable materials associated with worksite surfaces.

In the context of the compaction machine, a task may be to compact the surface at a worksite, whereby the weight of the compaction machine and the vibration of compaction machine drums compress the surface materials to a solidified mass. In some examples, loose asphalt is deposited and spread over the worksite surface, and one or more compaction machines may travel over the loose asphalt to produce a densified, rigid asphalt mat. The rigid, compacted asphalt may have the strength to accommodate significant vehicular traffic and, in addition, may provide a smooth, contoured surface capable of directing rain and other precipitation from the compacted surface. These and other tasks may be performed autonomously or semi-autonomously without continuous control by a human operator.

Autonomous operation presents advantages over traditional approaches to paving, construction, or mining activities, in that autonomous processes do not rely on operator judgement and/or perception when performing such tasks. Thus, these tasks can be performed by autonomous machines with reduced levels of operator training and/or experience. As a result, human error can be reduced in performing construction and mining tasks. Additionally, the autonomous machines may provide a more consistent performance and can work effectively for relatively long periods of time. As a result, autonomous machines, such as autonomous compactors, dozers, excavators, or the like, provide advantages in work quality, efficiency, and cost.

Autonomous machines, however, present a challenge in troubleshooting and/or testing when not operating as expected. Since the autonomous operation of these autonomous machines can involve operating multiple subsystems (e.g., propulsion, steering, etc.) in a seamless manner during operation, when a fault occurs, it can be challenging for a maintenance worker to pinpoint the source of the problem. Additionally, subsystems might need to be tested individually for ongoing operational maintenance needs.

One method of improving the testing of construction equipment is described in Korean Pat. No. 101922222 (hereinafter referred to as "the '222 reference"). The '222 reference describes a remote diagnosis system used with construction equipment. Service personnel can diagnose a construction equipment remotely without having the visit the construction site is described in the '222 reference. The construction equipment has a diagnostic module that can perform a diagnostic on the construction equipment and provide results remotely by network technology. However, the system described by the '222 reference does not pertain to autonomous machines, and further, does not allow a local or remote operator to test functionality of individual subsystems or groups of subsystems of the construction equipment. For example, the system described in the '222 reference does not enable a particular subsystem to be tested by controlling the subsystem to perform a test action useful in troubleshooting the construction equipment.

The present disclosure is directed toward overcoming the deficiencies of such systems.

SUMMARY

In an aspect of the present disclosure, an electronic control module (ECM) includes one or more processors and one or more computer-readable media storing computer-executable instructions that, when executed by the one or more processors, cause the one or more processors to receive, via a control interface, a first input indicating that an autonomous machine is to be tested. The processors further activate, based at least in part on the first input, a test mode in which the autonomous machine is operable to perform one or more test actions and receive, via the control interface, a second input indicating a first test action to be performed, the first test action including a first operation. The processors, still further, identify a first subsystem ECM associated with the first test action, generate a first instruction indicating a first operation of the first operation to be performed by the first subsystem ECM, and provide the first instruction to the first subsystem ECM, wherein the first instruction causes the first subsystem ECM to perform the first operation.

In another aspect of the present disclosure, a method for testing an autonomous machine includes receiving, by a master ECM and via a test interface displayed on a control interface, a first input indicating a first test action to be performed, the first test action including a first one or more operations and identifying a first subsystem ECM associated with the first test action. The method further includes generating, by the master ECM, a first instruction indicating a first operation of the first one or more operations to be performed by the first subsystem ECM and receiving data from one or more sensors. The method still further includes determining, based at least in part on the data from the one or more sensors, that the first test action avoids a collision and sending, by the master ECM and to the first subsystem ECM, the first instruction, wherein the first instruction causes the first subsystem ECM to perform the first operation.

In yet another aspect of the present disclosure, an autonomous machine includes a control interface and a master ECM configured to receive, via the control interface, a first input indicating that the autonomous machine is to be tested and activate, based at least in part on the first input, a test mode in which the autonomous machine is operable to perform one or more test actions. The master ECM is further configured to receive, via the control interface, a second input indicating a first test action to be performed, the first test action including a first one or more operations and determine a first subsystem ECM associated with the first test action. The master ECM is yet further configured to generate a first instruction indicating a first operation of the first one or more operations to be performed by the first subsystem ECM and send the first instruction to the first subsystem ECM. The autonomous machine further includes the first subsystem ECM configured to receive the first instruction and actuate, based at least in part on the first instruction, one or more mechanical devices to perform the first operation.

DETAILED DESCRIPTION

Wherever possible, the same reference numbers will be used throughout the drawings to refer to the same or like parts.

Figure 1:
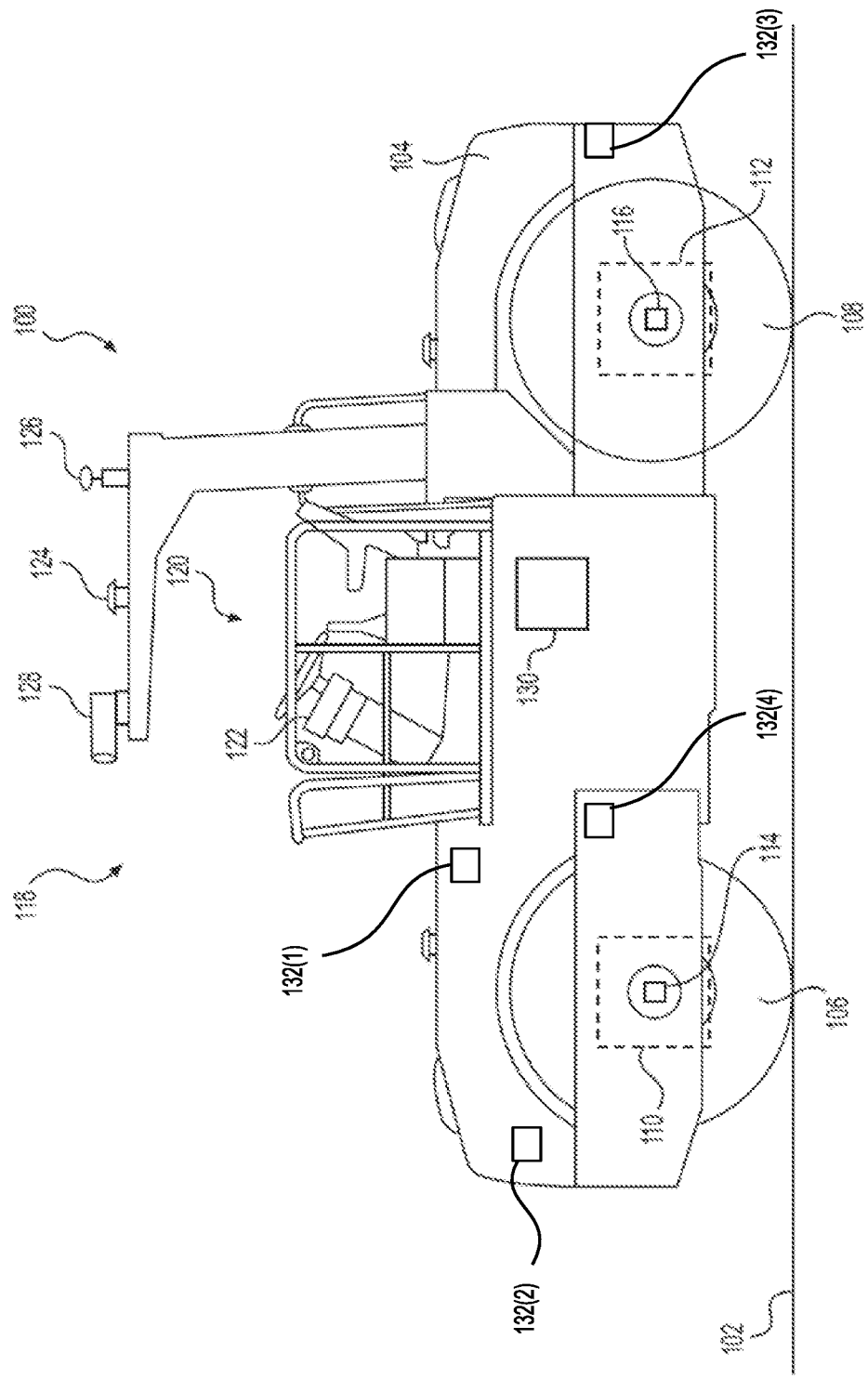
FIG. 1 is a schematic illustration of a machine that is configured to be tested, in accordance with the disclosure.

FIG. 1 is a schematic illustration of a machine 100 that is configured to be tested, in accordance with the disclosure. The machine 100 may be tested according to the systems and methods as disclosed herein. For example, individual subsystems of the machine 100 can be tested by performing test actions by the systems and methods described herein. Any of the machines 100, as described herein, operate as an autonomous machine, where an operator instructs the machine 100 to perform a task (e.g., compact a predefined plot of land) and the machine 100 proceeds to perform the task with no or little subsequent operator involvement.

The machine 100 is illustrated as a compaction machine which is used, for example, for road construction, highway construction, parking lot construction, and other such paving and/or construction applications. Although discussed in the context of the compaction machine, in other cases, the test systems and methods are applicable to test other types of machines 100, such as, a dozer, loader, excavator, paver, cold planer, backhoe, drilling machine, trencher, haul truck, or any other construction or transportation vehicle. The machine 100 is used in situations where it is necessary to compress loose stone, gravel, soil, asphalt, sand, concrete, and/or other materials of a worksite surface 102 to a state of greater compaction and/or density. As the machine 100 traverses the worksite surface 102, vibrational forces generated by the machine 100 and imparted to the worksite surface 102, acting in cooperation with the weight of the machine 100, compresses such loose materials. The machine 100 makes one or more passes over the worksite surface 102 to provide a desired level of compaction. In examples of the present disclosure, the machine 100 is configured to compact freshly deposited asphalt and/or other materials disposed on and/or associated with the worksite surface 102.

As shown in FIG. 1, the example machine 100 includes a frame 104, a first drum 106, and a second drum 108. The first and second drums 106, 108 comprise substantially cylindrical drums and/or other compaction elements of the machine 100, and the first and second drums 106, 108 are configured to apply vibration and/or other forces to the worksite surface 102 in order to assist in compacting the worksite surface 102. Although illustrated in FIG. 1 as having a substantially smooth circumference or outer surface, in other examples, the first drum 106 and/or the second drum 108 include one or more teeth, pegs, extensions, bosses, pads, and/or other ground-engaging tools (not shown) extending from the outer surface thereof. Such ground-engaging tools assist in breaking-up at least some of the materials associated with the worksite surface 102 and/or otherwise assist in compacting the worksite surface 102. The first drum 106 and the second drum 108 are rotatably coupled to the frame 104 so that the first drum 106 and the second drum 108 roll over the worksite surface 102 as the machine 100 travels.

The first drum 106 may have the same or different construction as the second drum 108. In some examples, the first drum 106 and/or the second drum 108 may be an elongated, hollow cylinder with a cylindrical drum shell that encloses an interior volume. The first drum 106 defines a first central axis about which the first drum 106 may rotate, and similarly, the second drum 108 may define a second central axis about which the second drum 108 rotates. In order to withstand being in rolling contact with and compacting the loose material of the worksite surface 102, the respective drum shells of the first drum 106 and the second drum 108 are made from a thick, rigid material such as cast iron or steel. The machine 100 is shown as having first and second drums 106, 108. However, other types of machines 100 or other machines 100 are suitable for use in the context of the present disclosure. For example, variations in the machine 100 include belted compaction machines or compaction machines having a single rotating drum, or more than two drums, for example. Rather than a self-propelled machine 100 as shown, the machine 100 might be a tow-behind or pushed unit configured to couple with a tractor (not shown).

The first drum 106 includes a first vibratory mechanism 110, and the second drum 108 include a second vibratory mechanism 112. The vibratory mechanism 110 is testable by the systems and methods described herein. Such vibratory mechanisms 110, 112 are disposed inside the interior volume of the first and second drums 106, 108, respectively. According to an example case, such vibratory mechanisms 110, 112 include one or more weights or masses disposed at a position off-center from the respective central axis around which the first and second drums 106, 108 rotate. As the first and second drums 106, 108 rotate, the off-center or eccentric positions of the masses induce oscillatory or vibrational forces to the first and second drums 106, 108, and such forces are imparted to the worksite surface 102. The weights are eccentrically positioned with respect to the respective central axis around which the first and second drums 106, 108 rotate, and such weights are typically movable with respect to each other (e.g., about the respective central axis) to produce varying degrees of imbalance during rotation of the first and second drums 106, 108. The amplitude of the vibrations produced by such an arrangement of eccentric rotating weights are varied by modifying and/or otherwise controlling the position of the eccentric weights with respect to each other, thereby varying the average distribution of mass (i.e., the centroid) with respect to the axis of rotation of the weights. Vibration amplitude in such a system increases as the centroid moves away from the axis of rotation of the weights and decreases toward zero as the centroid moves toward the axis of rotation. Thus, the vibrational amplitude and/or vibrational frequency can be controlled during operation. In other cases, the first and second vibratory mechanisms 110, 112 are replaced with any other mechanisms that modify the compaction effort of the first drum 106 or the second drum 108. The vibratory mechanisms, such as vibration amplitude and/or vibration frequency, can be tested by the systems and methods disclosed.

A sensor 114 is located on the first drum 106 and/or a sensor 116 is located on the second drum 108. In alternative cases, multiple sensors 114, 116 are located on the first drum 106, the second drum 108, the frame 104, and/or other components of the machine 100. In such examples, the sensors 114, 116 include compaction sensors configured to measure, sense, and/or otherwise determine the density, stiffness, compaction, compactability, and/or other characteristics of the worksite surface 102. Such characteristics of the worksite surface 102 are based on the composition, dryness, and/or other characteristics of the material being compacted. Such characteristics of the worksite surface 102 are also based on the operation and/or characteristics of the first drum 106 and/or the second drum 108. For example, the sensor 114 coupled to first drum 106 are configured to sense, measure, and/or otherwise determine the type of material, material density, material stiffness, and/or other characteristics of the worksite surface 102 proximate the first drum 106. Additionally, the sensor 114 coupled to the first drum 106 measures, senses, and/or otherwise determine operating characteristics of the first drum 106 including a vibration amplitude, a vibration frequency, a speed of the eccentric weights associated with the first drum 106, a distance of such eccentric weights from the axis of rotation, a speed of rotation of the first drum 106, etc. Additionally, it is understood that the sensor 116 coupled to the second drum 108 is configured to determine the type of material, material density, material stiffness, and/or other characteristics of the worksite surface 102 proximate the second drum 108, as well as a vibration amplitude, a vibration frequency, a speed of the eccentric weights associated with the second drum 108, a distance of such eccentric weights from the axis of rotation, a speed of rotation of the second drum 108, etc. It is not necessary to measure all of the operating characteristics of the first drum 106 or second drum 108 listed herein, instead, the above characteristics are listed for exemplary purposes.

With continued reference to FIG. 1, the machine 100 also includes an operator station 118. The operator station 118 includes a steering system 120 including a steering wheel, levers, and/or other controls (not shown) for steering and/or otherwise operating the machine 100. In such examples, the various components of the steering system 120 are connected to one or more actuators, a throttle of the machine 100, an engine of the compaction machine, a braking assembly, and/or other such compaction machine components, and the steering system 120 is used by an operator of the machine 100 to adjust a speed, travel direction, and/or other aspects of the machine 100 during use. The operator station 118 also includes a control interface 122 for controlling various functions of the machine 100. The control interface 122 include an analog, digital, and/or touchscreen display, and such a control interface 122 is configured to display, for example, at least part of a travel path and/or at least part of a compaction plan of the present disclosure.

The machine 100 further includes a location sensor 124 connected to a roof of the operator station 118 and/or at one or more other locations on the frame 104. The location sensor 124 is capable of determining a location of the machine 100, and include a component of a global positioning system (GPS). For example, the location sensor 124 includes a GPS receiver, transmitter, transceiver or other such device, and the location sensor 124 is in communication with one or more GPS satellites (not shown) to determine a location of the machine 100 continuously, substantially continuously, or at various time intervals.

The machine 100 also includes a communication device 126 configured to enable the machine 100 to communicate with the one or more other machines, and/or with one or more remote servers, processors, or control system(s)/interface(s) located remote from the machine 100 and/or the worksite at which the machine 100 is being used. Such a communication device 126 is configured to enable the machine 100 to communicate with one or more electronic devices located at the worksite and/or located remote from the worksite. In some examples, the communication device 126 includes a receiver configured to receive various electronic signals including position data, navigation commands, real-time information, and/or project-specific information. In some examples, the communication device 126 is configured to receive signals including information indicative of compaction requirements specific to the worksite surface 102. Such compaction requirements include, for example, a number of passes associated with the worksite surface 102 and required in order to complete the compaction of the worksite surface 102, a desired stiffness, density, and/or compaction of the worksite surface 102, a desired level of efficiency for a corresponding compaction operation, and/or other requirements. The communication device 126 may further include a transmitter configured to transmit position data indicative of a relative or geographic position of the machine 100, as well as electronic data such as data acquired via one or more sensors of the machine 100.

The machine 100 includes a camera 128. The camera 128 is be capable of providing visual feeds and supporting other functional features of the machine 100. In some examples, the camera 128 includes a digital camera configured to record and/or transmit digital video of the worksite surface 102 and/or other portions of the worksite in real-time. In still other examples, the camera 128 includes an infrared sensor, a thermal camera, or other like device configured to record and/or transmit thermal images of the worksite surface 102 in real-time. In some examples, the machine 100 may include more than one camera 128 (e.g., a camera at the front of the machine 100 and a camera at the rear of the machine 100).

The machine 100 further includes a master electronic control module (ECM) 130 in communication with the control interface 122, the location sensor 124, the communication device 126, the camera 128, the sensors 114, 116, and/or other components of the machine 100. These components are used in the autonomous operation of the machine 100 and also can be used to determine if a requested test action results in a collision and/or the machine 100 traversing an avoidance zone. The master ECM 130 is configured to cooperate with one or more subsystem ECM, such as a steering ECM 132(1), propulsion ECM 132(2), transmission ECM 132(3), vibration ECM 132(4), or the like, to control subsystems of the machine 100. The subsystem ECMs 132(1), 132(2), 132(3), 132(4) are referred to hereinafter, individually or in combination as "subsystem ECM 132" or "subsystem ECMs 132." Although four separate subsystem ECMs 132 are shown herein, it will be appreciated that there are any suitable number of subsystem ECMs 132 corresponding to any suitable number of subsystems of the machine 100. Further, for other machines 100 (e.g., excavators, dozers, etc.), there are a different number of subsystem ECMs 132 corresponding to any number of subsystems of the machine 100.

The master ECM 130 may generate a compaction plan, one or more travel paths for the machine 100 and/or other information useful to an operator of the machine 100. The master ECM 130 may also receive user input, such as via the control interface 122 and/or other remote control interface(s), to initiate any variety of actions, including autonomous operation and/or test action(s). The master ECM 130 may also be configured to update the display on the control interface 122 to display the current status of the machine 100 and/or provide options of actions that can be performed by the machine 100.

The master ECM 130 cooperates with the subsystem ECMs 132 to test the machine 100, as disclosed herein. For example, the master ECM 130 is configured to break a complex test action into individual operations that are to be controlled by the subsystem ECMs 132. In other words, the master ECM 130 may coordinate and/or control the operations of the machine 100, such as by sending messages including parameters of actions to be controlled by the individual subsystem ECMs 132 that control those actions. For example, if the machine 100 is to move forward and turn to the left at a particular angle, then the master ECM 130 may send message(s) to the propulsion and/or transmission ECMs 132(2), 132(3) with parameters that may control the speed of forward propulsion of the machine 100. The message(s) may include parameters for controlling the speed of the machine 100. Additionally, the master ECM 130 may send message(s) to the steering ECM 132(1) with parameters that may indicate the particular angle at which the machine is to turn to the left. In this way, the master ECM 130, in cooperation with the subsystem ECMs 132, can coordinate the operations of the machine 100. The master ECM 130 is further configured to take complex tasks, such as autonomous compaction of a certain worksite surface 102, and generate a set of sub-operations (e.g., propulsion actions, navigation actions, compaction actions, etc.) to implement the complex task.

The master ECM 130 and the subsystem ECMs 132 are also configured to test subsystems of the machine 100, according to the disclosure. During automated operation of the machine 100, it is difficult to troubleshoot and/or test subsystems of the machine 100 when there is unexpected operation of the machine 100. As disclosed herein, the machine 100 can be put into a test mode, such as via operator input via the control interface 122 or via a remote control interface, as received by the master ECM 130. The master ECM 130 is further configured to receive additional user input(s) to test individual subsystems of the machine 100. For example, the master ECM 130 may be configured to receive an input to test the reverse propulsion of the machine 100. In this case, the master ECM 130 may instruct, such as via messaging, the propulsion ECM 132(2) and the transmission ECM 132(3) to cause the machine 100 to move in a reverse direction. Thus, the master ECM 130 receives user input(s) to perform a test action in a test mode, identifies the subsystem ECM(s) 132 that would be involved in performing that test action, and generate and send instructions to those subsystem ECM(s) 132 to perform the test action.

In example cases, the master ECM 130 is configured to provide an interlock associated with a test action if the test action is likely to result in the machine 100 entering an avoidance zone or causing a collision. In other words, the master ECM 130 may receive data from various components, such as the location sensor 124, the camera 128, the sensors 114, 116, and use that data to determine if the requested test action is appropriate to perform. If the master ECM 130 determines that the test action is appropriate, then it may proceed to perform the requested test action in cooperation with other entities, such as the associated subsystem ECMs 132. On the other hand, if the requested test action is determined to result in a collision or cause the machine 100 to enter an avoidance zone, then the master ECM 130 may not perform the requested test action and/or indicate, such as on the control interface 122, that the requested test action is not appropriate.

The subsystem ECMs 132 are configured to receive messages and/or instructions (e.g., messages that instruct one or more actions) from the master ECM 130 during testing, as describe here. The messages may include parameters related to the test action, such as degrees to turn, engine throttle/rotations per minute (RPM), speed, vibration frequency, vibration amplitude, or any number of suitable test parameters. The subsystem ECMs 132 may receive the messages associated with the test and perform the requested actions according to the parameters provided. The subsystem ECMs 132 may control a variety of electrical, mechanical, and/or electro-mechanical elements, such as solenoids, hydraulic systems, pneumatic systems, motors, actuators, valves, power transistors, switches, etc., to perform the test related actions.

In some example cases, testing the machine 100 may entail testing the communications between the master ECM 130 and one or more of the subsystem ECMs 132 of the machine. For example, a test may encompass testing whether the master ECM 130 and the compaction ECM 132(4) are properly communicating with each other. To enable the communications test, the master ECM 130 is configured to send a message to one or more subsystem ECM(s) 132 to respond with a response message. If the master ECM 130 receives the expected from each of the subsystem ECM(s) 132, then it is determined that that the communications between the master ECM 130 and the subsystem ECM(s) 132 is functioning properly. However, if an expected response message is not received from a particular subsystem ECM 132, then the communications between that subsystem ECM 132 and the master ECM is determined to not be functioning properly.

The master ECM 130 and/or the subsystem ECMs 132 may embody single or multiple microprocessors, field programmable gate arrays (FPGAs), digital signal processors (DSPs), and/or other components configured to control the autonomous operations of the machine 100. Numerous commercially available microprocessors can be configured to perform the functions of the master ECM 130 and/or the subsystem ECMs 132. Various known circuits are associated with the master ECM 130 and/or the subsystem ECMs 132, including power supply circuitry, signal-conditioning circuitry, actuator driver circuitry (i.e., circuitry powering solenoids, motors, or piezo actuators), and communication circuitry. The present disclosure, in any manner, is not restricted to the type of master ECM 130 and/or the subsystem ECMs 132 or the positioning of the master ECM 130 and/or the subsystem ECMs 132 relative to the machine 100.

Figure 2:
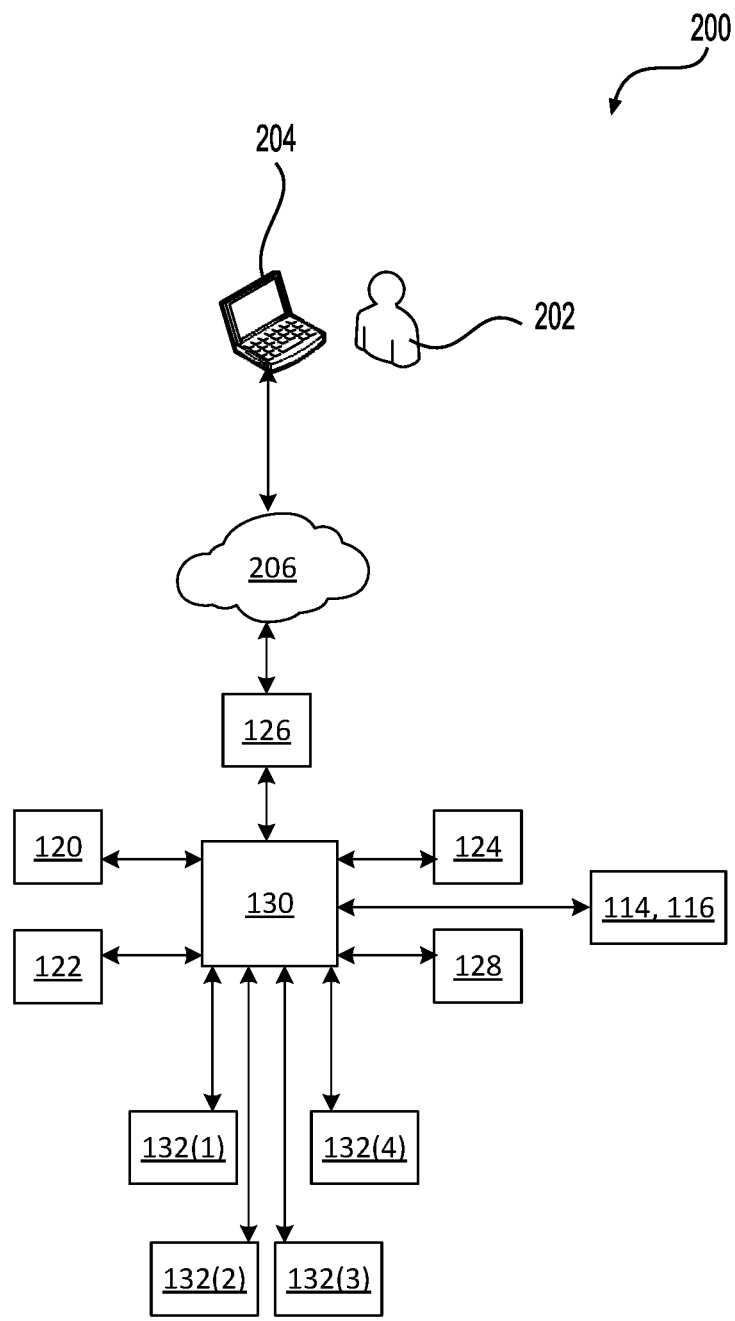
FIG. 2 is a schematic illustration of communicative links between various elements of a control system of the machine depicted in FIG. 1, in accordance with the disclosure.

FIG. 2 is a schematic illustration of communicative links between various elements of a control system 200 of the machine 100 depicted in FIG. 1, in accordance with the disclosure. In any of the examples described herein, the control system 200 includes the master ECM 130 in communications with various entities of the machine 100, such as the subsystem ECMs 132, the steering system 120, the control interface 122, the location sensor 124, the communication device 126, the camera 128, the sensors 114, 116, and/or any other sensors or components of the machine 100. In such examples, the master ECM 130 is configured to receive respective signals from such components.

The master ECM 130 is configured to receive user input via the control interface 122, as discussed herein. For example, an operator may use the control interface 122 to put the machine 100 in a test mode and further to request test action(s) to troubleshoot the machine 100. The master ECM 130 may receive these user input(s) for performing test action(s) and perform those test actions(s) in accordance with the disclosure herein.

The control system 200 may also include a remote control interface 204 that is configured to receive user input(s) from a remote operator 202. Although the remote control interface 204 is depicted as a laptop computer, it should be understood that the remote control interface 204 is any suitable computing device, such as a desktop computer, a server, a netbook computer, a smartphone, a personal digital assistant (PDA), a tablet computing device, or the like. The remote control interface 204 is located at a remote location from the machine 100 at the worksite or remote from the worksite. In some cases, the master ECM 130 is configured to receive multiple inputs, such as testing related inputs, from the control interface 122, as well as from the remote control interface 204. The master ECM 130 may also receive requests to perform autonomous tasks via the control interface 122 and/or the remote control interface 204. In any of the examples described herein, information indicative of the location of the perimeter of the worksite surface 102, information indicative of the perimeter of an avoidance zone, a compaction plan, a travel path of the machine 100, vibration amplitudes, vibration frequencies, a density, stiffness, or compactability of the worksite surface 102, and/or any other information to perform a task, such as an autonomous task, is received by the master ECM 130 from one or both of the control interface 122 and/or the remote control interface 204. The master ECM 130 may also be configured to provide updates to the status of the machine 100 (e.g., location, speed, etc.) via the control interface 122 and/or the remote control interface 204.

The remote control interface 204 is configured to interact with the master ECM via the communication device 126 over a network 206, such as the Internet. The network 206 may be any suitable network, such as a local area network ("LAN"), a wide area network ("WAN"), or a collection of networks, such as the Internet. Protocols for network communication, such as WiFi, TCP/IP, and/or other suitable protocols and standards are used to implement the network 206. Although examples are described herein as using a network such as the Internet, other distribution techniques may be implemented that transmit information wirelessly or via memory cards, flash memory, or other portable memory devices.

In example cases, the master ECM 130 is configured to receive a variety of data to determine if a requested test action is appropriate. For example, the master ECM 130 may receive one or more signals from the location sensor 124 including information indicating a location of the machine 100. The location sensor 124 may be configured to determine the location of the machine 100 as the machine 100 traverses a perimeter of the worksite surface 102 and/or as the machine 100 travels to any other worksite location. The location sensor 124 may be connected to and/or otherwise in communication with one or more satellites or other GPS components configured to assist the location sensor 124 in determining the location of the machine 100 in any of the example processes described herein. The location sensor 124, in some cases, may also include one or more inertial sensors, such as acetometers, gyroscopes, or the like, to determine location of the location of the machine 100. The master ECM 130 may be configured to receive data from the location sensor 124 to determine a location of the machine 100 and determine if a requested test action would cause the machine 100 to enter an avoidance zone and/or that may potentially result in damage to the machine 100. Such an avoidance zone may include, for example, a trench, ditch, body of water, manhole, electrical connection, wooded area, and/or any other area that may result in damage to the machine 100 if traversed.

The master ECM 130, when the machine operates in autonomous mode, uses information indicative of a location of a perimeter of the worksite surface 102, information indicative of a location of a perimeter of one or more avoidance zones, information indicative of one or more compaction requirements specific to the worksite surface 102, and/or any other received information to generate a compaction plan for the machine 100 and associated with the worksite surface 102. Such a compaction plan may include a travel path for the machine 100 that extends substantially within the perimeter of the worksite surface. In such examples, such a travel path may maintain the machine 100 outside of the one or more avoidance zones. Such a compaction plan may include visual indicia indicating, among other things, the perimeter of the worksite surface 102, the perimeters of the one or more avoidance zones, and/or the travel path of the machine 100. Such a compaction plan may also include a speed of the machine 100, a vibration frequency of the first drum 106 and/or the second drum 108, a vibration amplitude of the first drum 106 and/or the second drum 108, and/or other operating parameters of the machine 100. In such examples, such a compaction plan may also include visual indicia indicating one or more such operating parameters. The master ECM 130 may determine the compaction plan, the travel path, the speed of the machine 100, a vibration frequency of the first drum 106 and/or the second drum 108, a vibration amplitude of the first drum 106 and/or the second drum 108, and/or other operating parameters of the machine 100 using one or more compaction plan models, algorithms, neural networks, look-up tables, and/or through one or more additional methods. In an exemplary case, the master ECM 130 may have an associated memory in which various compaction plan models, algorithms, look-up tables, and/or other components may be stored for determining the compaction plan, travel path, and/or operating parameters of the machine 100 based on one or more inputs. Such inputs may include, for example, the circumference and/or width of the first and second drums 106, 108, the mass of the machine 100, information indicative of the location of the perimeter of the worksite surface 102, information indicative of the location of the perimeter of an avoidance zone, information indicative of one or more compaction requirements specific to the worksite surface 102, and/or any other received information.

The master ECM 130 can use other data to determine parameters for performing automated tasks and/or whether a requested test action is appropriate to perform. The master ECM 130 may also receive respective signals from the sensors 114, 116. As noted above, the sensors 114, 116 may be configured to determine a density, stiffness, compactability, and/or other characteristic of the worksite surface 102. Such sensors 114, 116 may also be configured to determine the vibration frequency, vibration amplitude, and/or other operational characteristics of the first drum 106 and the second drum 108, respectively. In some examples, the sensor 114 may determine a density, stiffness, compactability, and/or other characteristic of a portion of the worksite surface 102 proximate the first drum 106 and/or located along a travel path of the machine 100. The sensor 114 may send one or more signals to the master ECM 130 including information indicative of such a characteristic, and the master ECM 130 may control the vibratory mechanism 110 to modify at least one of a vibration frequency of the first drum 106 and a vibration amplitude of the first drum 106, as the machine 100 traverses the travel path, based at least partly on such information. In such examples, the sensor 116 may determine one or more of the same characteristics of a portion of the worksite surface 102 proximate the second drum 108 and/or located along a travel path of the machine 100. The sensor 116 may send one or more signals to the master ECM 130 including information indicative of such a characteristic, and the master ECM 130 may control the vibratory mechanism 112 to modify at least one of a vibration frequency of the second drum 108 and a vibration amplitude of the second drum 108, as the machine 100 traverses the travel path, based at least partly on such information. The data received from the sensors 116, 118 may also be used to determine whether a requested test action is appropriate. For example, the data from the sensors 114, 116 may indicate whether compacting a particular type of worksite surface 102 is likely to result in damage to the machine 100 or the other infrastructure.

The camera 128 may provide data that can be processed to determine if an intended test action is appropriate to perform. For example, the master ECM 130 may receive image data from the camera 128 and, using image processing, make a determination of whether a test action might result in the machine 100 colliding with another object. In this way, the camera 128 provides a mechanism to prevent test actions with unwanted consequences. Additionally, although not shown here, there may be other collision avoidance sensors, such as radio detection and ranging (RADAR), light detection and ranging (LIDAR), sound navigation ranging (SONAR), to determine if a requested test action is appropriate to perform.

Figure 3:
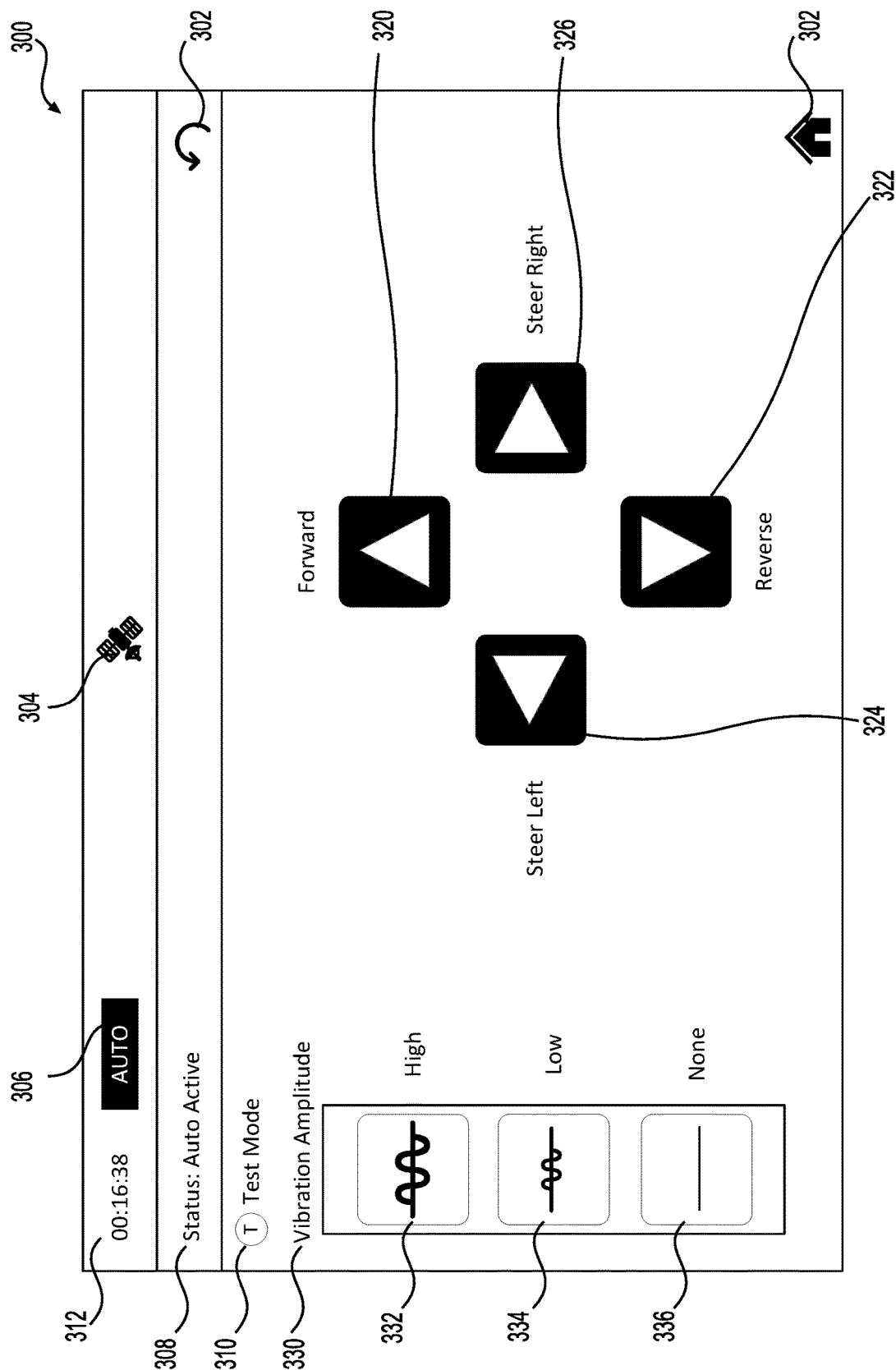
FIG. 3 is a schematic illustration of an example user interface (UI) with which a user can interact to test the machine depicted in FIG. 1, in accordance with the disclosure.

FIG. 3 is a schematic illustration of an example user interface (UI) 300 with which a user can interact to test the machine 100 depicted in FIG. 1, in accordance with the disclosure. The UI 300 is displayed on the control interface 122 and/or the remote control interface 204. The UI 300 may include a variety of icons and/or display fields. An operator 202 can interact with at least some of the icons and/or display fields by any suitable mechanism, such as via a touch screen of the control interface 122 and/or the remote control interface 204, or alternatively a touch stylus, a mouse, a trackball, or the like. The UI 300 may include a one or more navigation icons 302 for displaying a previous display or a home display (e.g., default display or home display). UI 300 may display a variety of icons indicating the status of the machine 100. For example, icon 304 may indicate that the autonomous machine is receiving GPS satellite signals. Icon 306, 308 may indicate a status (e.g., auto mode, active, etc.) of the machine 100. Icon 310 may indicate that the autonomous machine is in test mode. This mode may have been selected by an operator 202 from a previous screen of the control interface 122 and/or the remote control interface 204. Display field 312 may show a timer or a clock, such as a timer that indicates time of operation of the autonomous machine.

Icons 320, 322, 324, 326 may be selected by the operator 202 to perform test actions of forward navigation, reverse navigation, steer left, or steer right, respectively. If the operator selects one of these icons 320, 322, 324, 326, on the control interface 122 and/or the remote control interface 204, the corresponding test action may be indicated to the master ECM 130 as being requested. The field 330 may indicate vibrational amplitudes of the machine 100 that may be tested. Icons 332, 334, 336, if selected on the control interface 122 and/or the remote control interface 204, may indicate to the master ECM 130 a test action of a high level of vibration amplitude, a low level of vibration amplitude, or no vibration, respectively. Although a certain implementation of the UI 300 is shown here, in other examples there may be any suitable types and variations of UI 300 for receiving operator 202 input of which test actions to perform on the machine 100, such as the machine 100, or any other type of machine 100.

Figure 4:
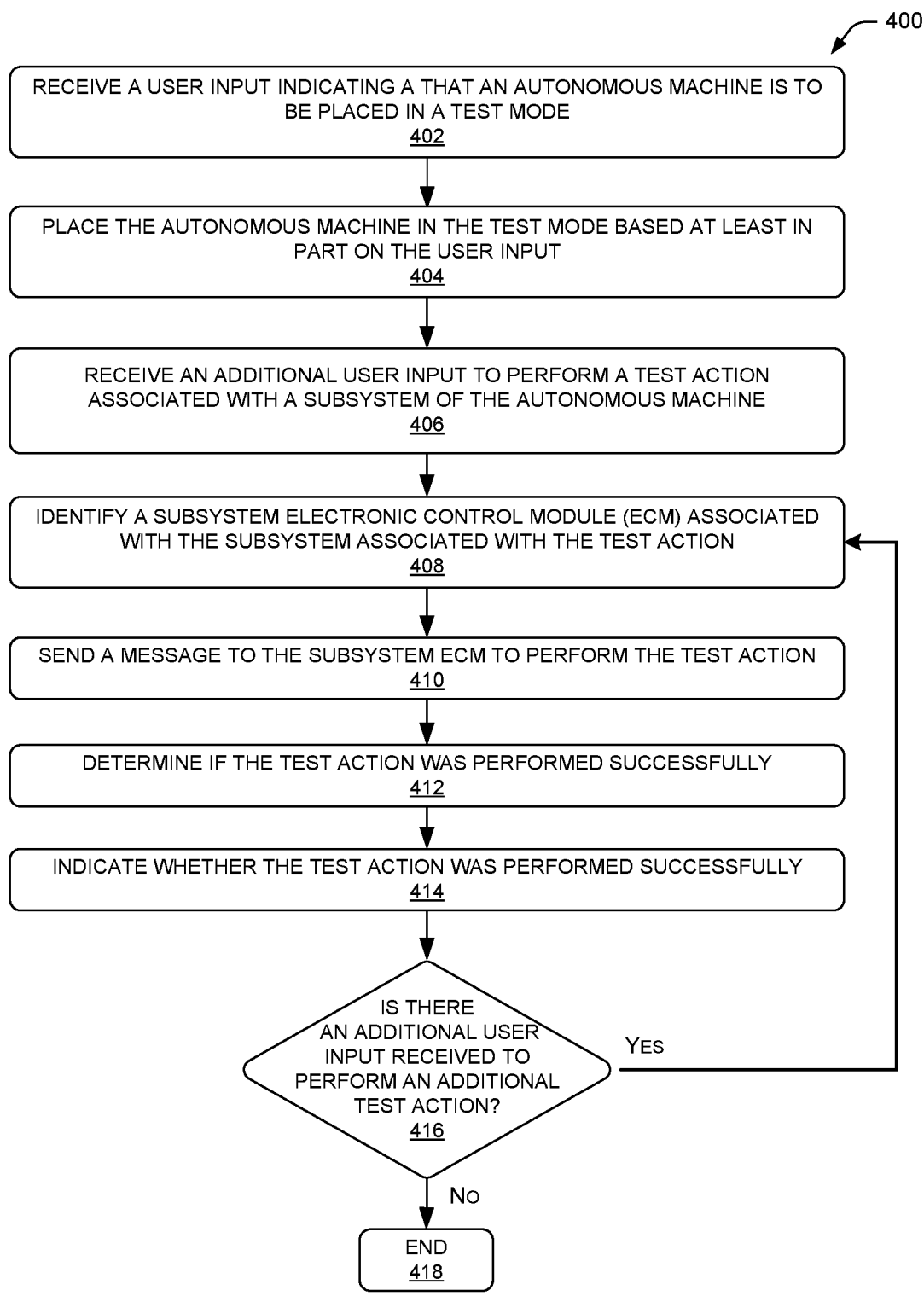
FIG. 4 is a flow diagram depicting an example method for testing the machine of FIG. 1, in accordance with the disclosure.

FIG. 4 is a flow diagram depicting an example method 400 for testing the machine 100 of FIG. 1, in accordance with the disclosure. The method 400 is performed by the master ECM 130 in cooperation with one or more other entities of machine 100.

At block 402, the master ECM receives a user input indicating that an autonomous machine is to be placed in a test mode. This input may be received via the control interface 122 and/or the remote control interface 204 when an operator provides the input. The operator may observe erroneous operation of the autonomous machine and decide to place the autonomous machine in a test mode as a result. In other cases, the test mode may be requested for the purposes of scheduled maintenance. The master ECM may receive the indication of the user input as a message, in some cases.

At block 404, the master ECM places the autonomous machine in the test mode based at least in part on the user input. In this test mode, the machine 100 is configured to perform one or more test actions, as described herein. In test mode, the master ECM 130 is ready to receive test action requests, such as from the control interface 122 and/or the remote control interface 204.

At block 406, the master ECM receives an additional user input to perform a test action associated with a subsystem of the autonomous machine. This test action may be requested by the operator 202 interacting with the UI 300, as displayed on the control interface 122 and/or the remote control interface 204. For example, the operator 202 may wish to test forward propulsion by selecting icon 320 of the UI 300 of FIG. 3. As another example, the operator 202 may wish to test high amplitude vibration by selecting icon 332.

At block 408, the master ECM identifies a subsystem ECM associated with the subsystem to be tested. The requested test action may involve a series of operations to fulfill the test action. Each of these operations may be associated with a subsystem ECM 132. For example, for a navigation task, the master ECM 130 may identify the propulsion ECM 132(2) as the subsystem ECM to perform an operation (e.g., forward movement) of the test action. In some cases, the association between a test action and individual ones of the subsystem ECMs may be stored in memory and/or storage of the master ECM. Some test actions may involve multiple operations, where different operations may have to be performed by two or more subsystem ECMs 132. The master ECM 130 may have a mapping (e.g., a look-up table stored in memory) for determining subsystem ECM(s) 132 associated with particular ones of the requested test actions. For example, a look-up table may be accessed by the master ECM 130 to determine that a vibration test may need to invoke the compaction ECM 132(4).

At block 410, the master ECM sends a message to the subsystem ECM to perform the test action. The message may provide instructions to the subsystem ECM 132 to perform one or more operation of the test action. In cases where more than one subsystem ECM 132 is associated with a test action, message(s) may be sent to each of the subsystem ECM(s) 132 to perform operations associated with the requested test action. For example, if a test action includes moving forward and turning right, corresponding messages with instructions may be sent by the master ECM 130 to the propulsion ECM 132(2) and the steering ECM 132(1). The message(s) may include a variety of parameters that are to be implemented by the subsystem ECMs 132 in performing the operation(s) of the requested test action. In some cases, the parameter values are previously associated with the test action. For example, a test action of forward propulsion might be performed at 7 miles per hour (MPH) and thus a speed of 7 MPH is provided as a parameter with which to perform the test action. In other cases, the parameter values are selectable by an operator 202. Some parameters include, for example, speed, distance, acceleration, direction, time period of an action, degrees to turn, force to be applied, work to be done, throttle valve location/angle, rotations per minute (RPM), vibrational amplitude, vibrational frequency, combinations thereof, or the like.

At block 412, the master ECM determines whether the test action was performed successfully. In some cases, the master ECM 130 receives an indication, such as from the subsystem ECM 132, that the instructed operation(s) of the requested test action were completed successfully. Similarly, if more than one subsystem ECM 132 was involved in performing operations of the requested test action, then the master ECM 130 solicits and/or receives an indication of success of the respective operations of the test action from individual subsystem ECMs 132. In other cases, the master ECM 130 determines, such as by using sensor data and/or other feedback mechanisms, whether the test action was successfully performed. For example, if a test action involves moving the machine 100 forward by 200 feet, the master ECM 130, to determine whether the test action was successful, processes location data, as received from the location sensor 124, to assess the success of the test action.

At block 414, the master ECM may indicate whether the test action was performed successfully. The master ECM 130 causes the control interface 122 and/or the remote control interface 204 to display an indication of the success, or the lack thereof, of the test action. It should be understood that the processes of blocks 412 and 414 may be optional, and in some cases, the master ECM 130 may not provide any indication of whether the test action was successful. In other alternatives, the master ECM 130 may confirm, such as on the control interface 122 and/or the remote control interface 204, that the requested test action was attempted and an operator 202 is then able to assess whether the requested test action was successful.

At block 416, the master ECM determines whether there are any additional user inputs to perform any additional test actions. If it is determined that there is an additional user input to perform an additional test action, then the method 400 may return to block 408 to perform the next requested test action. On the other hand, if there is no additional user input to perform an additional test action, then the method 400 may end at block 418.

It should be noted that some of the operations of method 400 may be performed out of the order presented, with additional elements, and/or without some elements. Some of the operations of method 400 may further take place substantially concurrently and, therefore, may conclude in an order different from the order of operations shown above. It should also be noted that in some cases, there may be other components of the machine 100 involved in one or more of the operations, as described herein.

Figure 5:
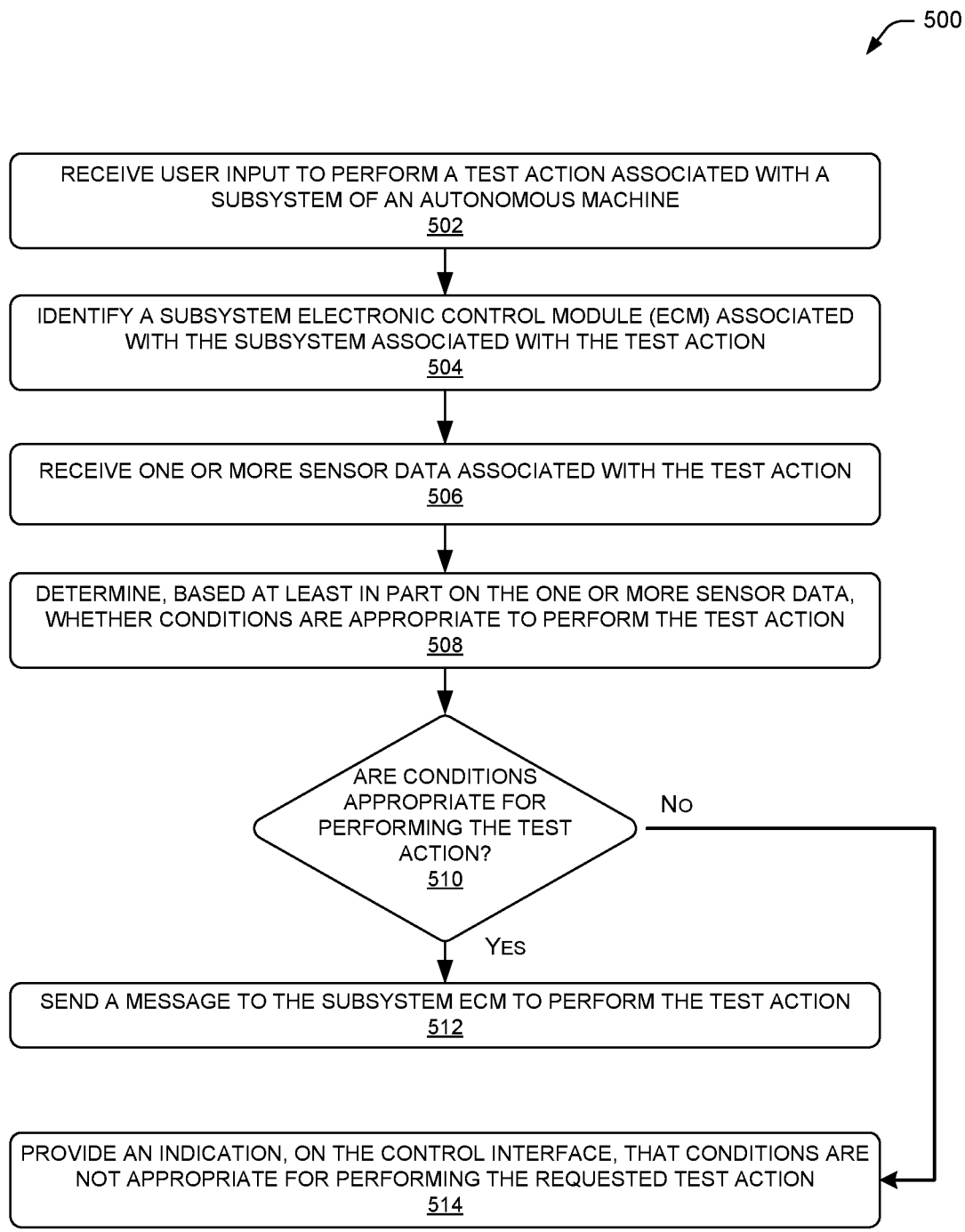
FIG. 5 is a flow diagram depicting an example method for initiating a test action on the machine of FIG. 1 based at least in part on determining the appropriateness of the test action, in accordance with the disclosure.

FIG. 5 is a flow diagram depicting an example method 500 for initiating a test action on the machine of FIG. 1 based at least in part on determining the appropriateness of the test action, in accordance with the disclosure. The method 500 is performed by the master ECM 130 in cooperation with one or more other entities of machine 100.

At block 502, the master ECM receives user input to perform a test action associated with a subsystem of an autonomous machine. This test action may be requested by the operator 202 interacting with the UI 300, as displayed on the control interface 122 and/or the remote control interface 204. For example, the operator 202 may wish to test reverse propulsion by selecting icon 322 of the UI 300 of FIG. 3.

At block 504, the master ECM identifies a subsystem ECM associated with the subsystem to be tested. The requested test action may involve a series of operations to complete the test action. Each of these operations may be associated with a subsystem ECM 132. For example, for a navigation task, the master ECM 130 identifies the propulsion ECM 132(2) as the subsystem ECM to perform an operation (e.g., forward movement) of the test action. Some test actions may involve multiple operations, where different operations may have to be performed by two or more subsystem ECMs 132. The master ECM 130 may have a mapping (e.g., a look-up table stored in memory) for determining subsystem ECM(s) 132 associated with particular ones of the requested test actions.

At block 506, the master ECM receives sensor data associated with the test action. This sensor data may include any suitable data and/or information such as location data from the location sensor 124, image data from the camera, vibrational data from sensors 114, 116, or any other sensor data, such as ranging data from LIDAR, RADAR, and/or SONAR devices. These type of sensor data may be suitable to be processed and/or analyzed (e.g., image analysis) by the master ECM 130 make predictions related to the appropriateness of the requested test action.

At block 508, the master ECM determines whether conditions are appropriate to perform the test action based at least in part on the one or more sensor data. The sensor data may be used by the master ECM 130 to predict if there are any collisions, entry into avoidance zones, or otherwise damage to the machine 100 that may result from executing the requested test action prior to executing the requested test action. The master ECM 130, therefore, predicts a future location and/or outcome associated with performing the test action and whether that location and/or other outcome is likely to cause an undesired outcome. For example, the master ECM 130 may determine if the machine 100 is likely to traverse an avoidance zone by performing the test action. As another example, the master ECM may predict whether it is likely to collide with another object (e.g., another machine) by performing the requested test action.

At block 510, if the master ECM determines that conditions are appropriate to perform the test action, then at block 512, a message may be sent to the subsystem ECM to perform the test action. At block 512, the message may provide instructions to the subsystem ECM 132 to perform one or more operation of the test action. In cases where more than one subsystem ECM 132 is associated with a test action, message(s) may be sent to each of the subsystem ECM(s) 132 to perform operations associated with the requested test action. The message(s) may include a variety of parameters that are to be implemented by the subsystem ECMs 132 in performing the operation(s) of the requested test action. Similar to method 400, blocks 412 and 414, in some cases, the master ECM 130 may optionally provide a confirmation of the requested test action being attempted and/or whether the test action was successful.

If however, it is determined, at block 510, that conditions are not appropriate for performing the test action, then at block 514, an indication may be provided that conditions are not appropriate for performing the requested test action. In some cases, interlock system(s) may prevent the performance of the test action. In other cases, the master ECM 130 may indicate, such as on the control interface 122 and/or the remote control interface 204, that there may be a concern with performing the requested test action.

It should be noted that some of the operations of method 500 may be performed out of the order presented, with additional elements, and/or without some elements. Some of the operations of method 500 may further take place substantially concurrently and, therefore, may conclude in an order different from the order of operations shown above. It should also be noted that in some cases, there may be other components of the machine 100 involved in one or more of the operations, as described herein.

Figure 6:
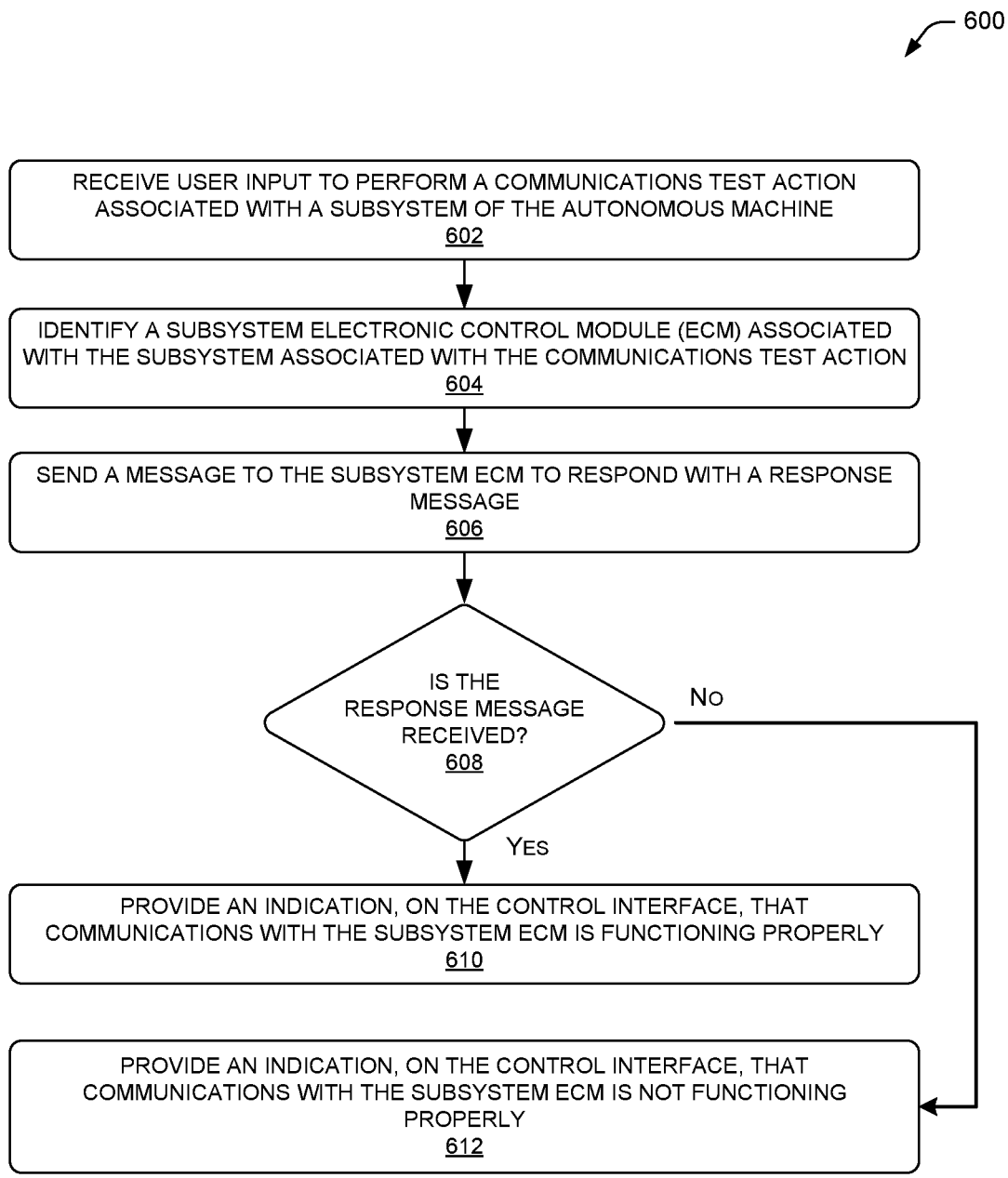
FIG. 6 is a flow diagram depicting an example method for testing communications between a master electronic control module (ECM) and a subsystem ECM of the machine of FIG. 1, in accordance with the disclosure.

FIG. 6 is a flow diagram depicting an example method 600 for testing communications between a master electronic control module (ECM) 130 and a subsystem ECM 132 of the machine 100 of FIG. 1, in accordance with the disclosure. The method 600 is performed by the master ECM 130 in cooperation with one or more other entities of machine 100.

At block 602, the master ECM receives user input to perform a communications test action associated with a subsystem of the autonomous machine. This test action may be requested by the operator 202 interacting with the UI 300, as displayed on the control interface 122 and/or the remote control interface 204.

At block 604, the master ECM identifies a subsystem ECM associated with which the communications test action is to be performed. The subsystem and/or the subsystem ECM 132 may be indicated in the test action request. In some cases, the master ECM 130 can determine an associated subsystem ECM 132 of a subsystem from a correspondence table (e.g., look-up table).

At block 606, the master ECM sends a message to the subsystem ECM to respond with a response message. The response instruction may be explicitly provided in the message, in some cases. In other cases, the subsystem ECM 132 may know to send a response message responsive to receiving the message from the master ECM 130.

At block 608, the master ECM determines if the response message is received. If the response is received, then at block 610, it may be indicated, on the control interface 122 and/or the remote control interface 204, that communications with the subsystem ECM 132 is functioning properly. If, however, the response message is not received, then the method 600 may advance to block 612, where it may be indicated, on the control interface 122 and/or the remote control interface 204, that the communications with the subsystem ECM 132 is not functioning properly.

It should be noted that some of the operations of method 600 may be performed out of the order presented, with additional elements, and/or without some elements. Some of the operations of method 600 may further take place substantially concurrently and, therefore, may conclude in an order different from the order of operations shown above. It should also be noted that in some cases, there may be other components of the machine 100 involved in one or more of the operations, as described herein.

Figure 7:
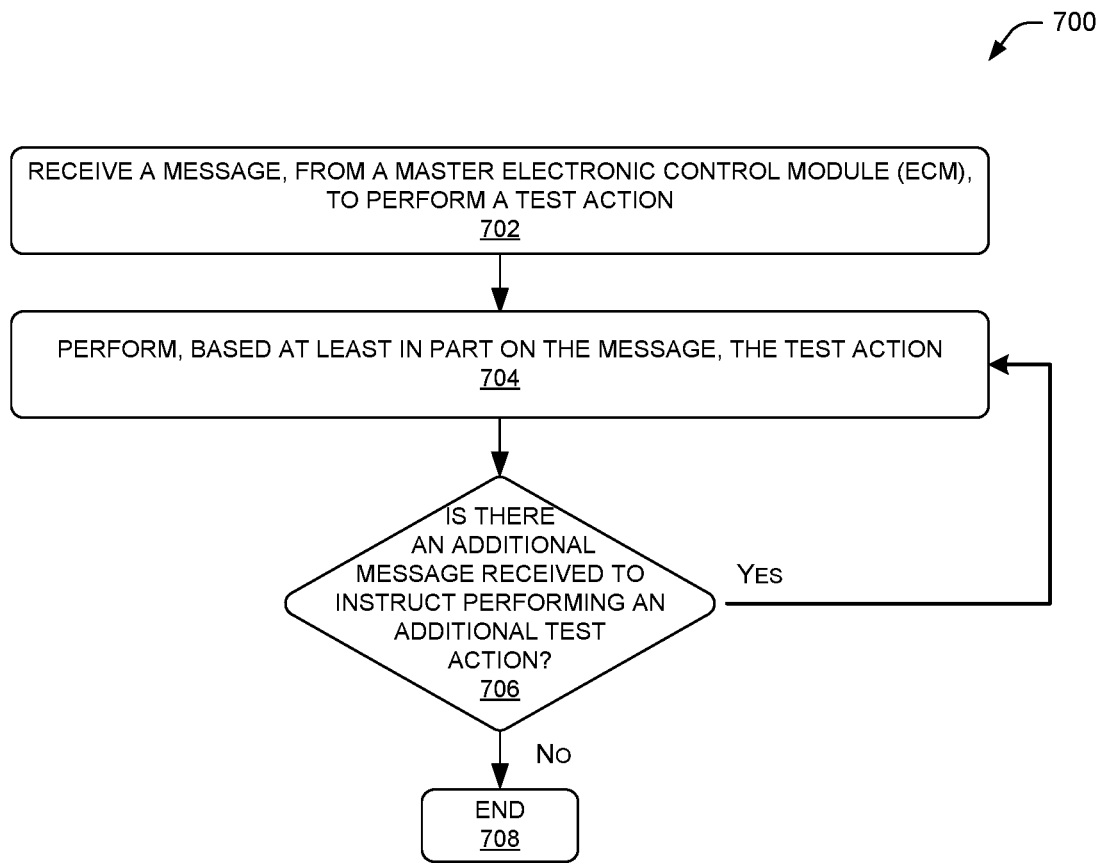
FIG. 7 is a flow diagram depicting an example method for performing a test action on the machine of FIG. 1, in accordance with the disclosure.

FIG. 7 is a flow diagram depicting an example method 700 for performing a test action on the machine 100 of FIG. 1, according to example cases of the disclosure. The method 700 is performed by the subsystem ECMs 132 in cooperation with one or more other entities of machine 100.

At block 702, a subsystem ECM receives a message the master ECM to perform a test action. This message may be sent to the subsystem ECM 132 from the master ECM 130 by the processes of block 410 of method 400 of FIG. 4. This message may include instructions related to an operation of a requested test action.

At block 704, the subsystem ECM performs the test action based at least in part on the message. The subsystem ECM 132 may control any variety of electrical, mechanical, and/or electro-mechanical elements, such as solenoids, hydraulic systems, pneumatic systems, motors, actuators, valves, power transistors, switches, etc., to perform the test action and/or operation thereof.

At block 706, the subsystem ECM determines if there is an additional message received to perform an additional test action. If there are no other messages received to perform additional test action(s), then at block 708, the method 700 may end. However, if there is an additional message received to perform another test action, then the method 700 may return to block 702.

It should be noted that some of the operations of method 700 may be performed out of the order presented, with additional elements, and/or without some elements. Some of the operations of method 700 may further take place substantially concurrently and, therefore, may conclude in an order different from the order of operations shown above. It should also be noted that in some cases, there may be other components of the machine 100 involved in one or more of the operations, as described herein.

Figure 8:
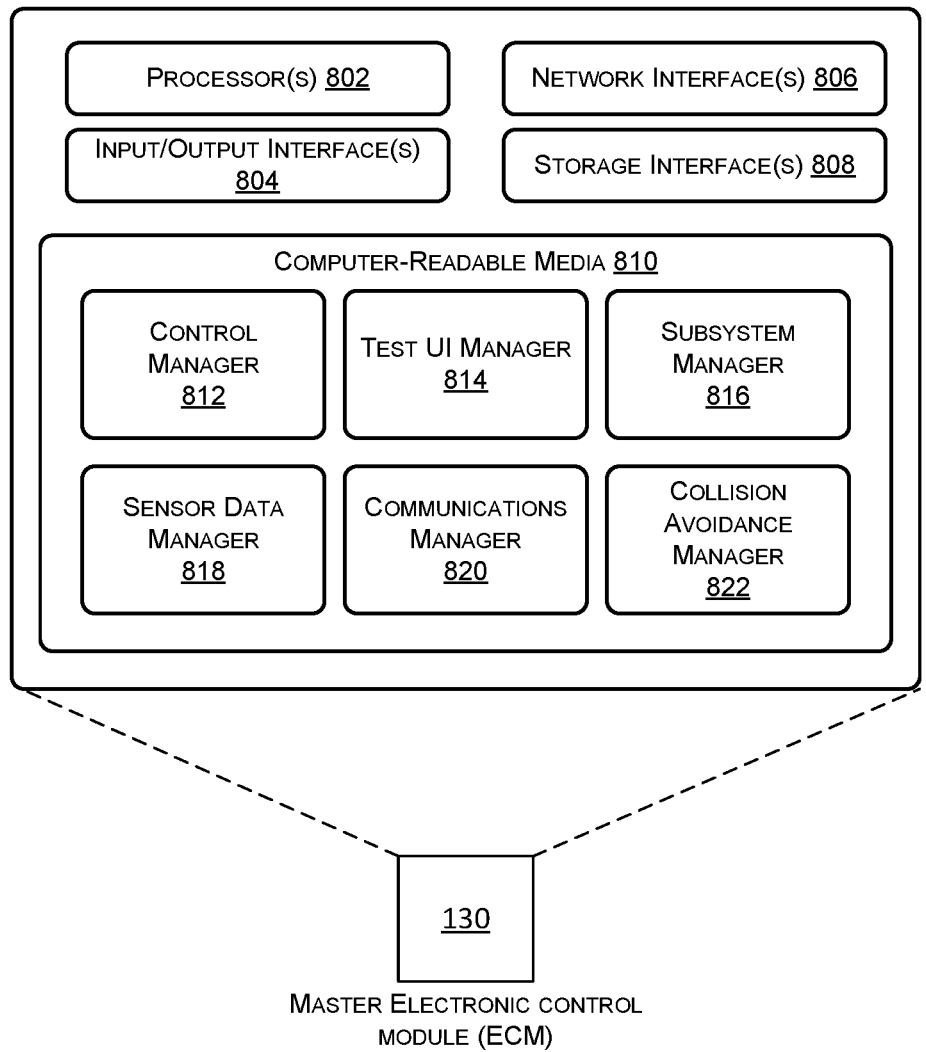
FIG. 8 is a block diagram of an example master electronic control module (EMC) that control testing of the machine of FIG. 1, in accordance with the disclosure.

FIG. 8 illustrates a block diagram of an example master electronic control module (EMC) 130 that may control testing of the machine 100 of FIG. 1, in accordance with example cases of the disclosure. The descriptions of the components of the subsystem ECMs 132 may be similar to the descriptions of the components of the master ECM 130. The master ECM 130 includes one or more processor(s) 802, one or more input/output (I/O) interface(s) 802, one or more communication interface(s) 806, one or more storage interface(s) 808, and computer-readable media 810.

In some implementations, the processors(s) 802 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 802 may possess its own local memory, which also may store program modules, program data, and/or one or more operating systems. The one or more processor(s) 802 may include one or more cores.

The one or more input/output (I/O) interface(s) 804 may enable the master ECM 130 to detect interaction with a user. For example, a user may be able to maintain, update, and/or operate the master ECM 130. Thus, the I/o interface(s) may include and/or enable the control interface 122 and/or the remote control interface 204.

The network interface(s) 604 may enable the master ECM 130 to communicate via the one or more network(s). The network interface(s) 806 may include a combination of hardware, software, and/or firmware and may include software drivers for enabling any variety of protocol-based communications, and any variety of wireline and/or wireless ports/antennas. For example, the network interface(s) 806 includes one or more of WiFi, cellular radio, a wireless (e.g., IEEE 802.1x-based) interface, a Bluetooth® interface, and the like.

The storage interface(s) 808 may enable the processor(s) 802 to interface and exchange data with the computer-readable medium 810, as well as any storage device(s) external to the master ECM 130. The storage interface(s) 808 may further enable access to removable media.

The computer-readable media 810 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 may be implemented as computer-readable storage media (CRSM), which may be any available physical media accessible by the processor(s) 802 to execute instructions stored on the memory 810. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 802. The computer-readable media 810 may have an operating system (OS) and/or a variety of suitable applications stored thereon. The OS, when executed by the processor(s) 802 may enable management of hardware and/or software resources of the master ECM 130.

Several components such as instruction, data stores, and so forth may be stored within the computer-readable media 810 and configured to execute on the processor(s) 802. The computer readable media 810 may have stored thereon a control manager 812, a test user interface (UI) manager 814, an subsystem manager 816, a sensor data manager 818, communications manager 820, and collision avoidance manager 822. It will be appreciated that each of the components 812, 814, 816, 818, 820, 822 may have instructions stored thereon that when executed by the processor(s) 802 may enable various functions pertaining to testing the machine 100, as described herein.

The instructions stored in the control manager 812, when executed by the processor(s) 802, may configure the master ECM 130 to control various aspects of the machine 100, such as placing the machine in a test mode where the machine is configured to perform one or more test actions as may be requested by an operator 202. The processor(s) 802 may also be configured to provide instructions to various subsystem ECMs 132, not only for purposes of testing, but also during autonomous operation.

The instructions stored in the UI manager 814, when executed by the processor(s) 802, may configure the master ECM 130 to receive user input via the UI 300, as displayed on the control interface 122 and/or the remote control interface 204. The processor(s) 802 may further be configured to display system status of the machine 100 on the UI 300.

The instructions stored in the subsystem manager 816, when executed by the processor(s) 802, may configure the master ECM 130 to identify subsystems of the machine 100 and/or their corresponding subsystem ECMs 132 that are to be engaged in a test action, as requested by a user. The correspondence between test action and one or more subsystem ECMs may be stored in computer-readable media 810 and may be accessed by the processor(s) 802 to identify subsystem ECMs 132 to engage to perform a test action.

The instructions stored in the sensor data manager 818, when executed by the processor(s) 802, may configure the master ECM 130 to receive sensor data from any variety of sensors, such as location sensor 124, sensors 114, 116, camera 128, LIDAR sensor(s), or the like. This sensor data may be managed and or stored by the processor(s) 802 to perform autonomous operation, test actions, and/or to assess the appropriateness of a test action that has been requested.

The instructions stored in the communications manager 820, when executed by the processor(s) 802, may configure the master ECM 130 to test the communications between itself and one or more subsystem ECMs 132. The processor(s) 802 may be configured to send a message to a subsystem ECM 132 with which communications is to be tested. The master ECM 130 may determine if communications with a subsystem ECM 132 is functioning properly based at least in part on receiving a response message after sending the communications test message.

The instructions stored in the collision avoidance manager 822, when executed by the processor(s) 802, may configure the master ECM 130 to process received sensor data, such as image data from the camera 128, to determine if a requested test action is appropriate to perform. The processor(s) 802 may be configured to perform analysis, such as image analysis, to determine any number of undesired outcomes resulting from performing a requested test action, such as a collision with another object. Other undesired outcomes may include traversing an avoidance zone (e.g., an avoidance zone) such as a pond, where the machine 100 may get stuck.

INDUSTRIAL APPLICABILITY

The present disclosure describes systems, apparatus, and methods for testing machines 100, such as construction machines (e.g., a compactor) that can operate in an autonomous mode to perform one or more tasks. For example, the present disclosure describes a test system where a master ECM receives user input that a subsystem of the machine 100 is to be tested by performing a test action. The master ECM identifies one or more subsystem ECMs 132 that are to perform operations of the test action. The master ECM 130 instructs the subsystem ECMs 132 to perform the operations of the task. Thus, an operator is able to test individual subsystems of the machine 100.

By the testing systems and methods disclosed herein, the viability of using autonomous machines for construction, mining, farming, and other activities is improved. Thus, autonomous machines can be deployed at a work site and the autonomous machines can also be diagnosed and repaired in the field. This leads to improved levels of worker and capital efficiency, greater uptime of construction equipment, and greater efficiency of construction projects.

Although the systems and methods of testing machines 100 are discussed in the context of an machine 100, it should be appreciated that the systems and methods discussed herein may be applied to a wide array of machines and vehicles across a wide variety of industries, such as construction, mining, farming, transportation, military, combinations thereof, or the like. For example, the testing system disclosed herein may be applied to an excavator in the mining industry or a harvester in the farming industry.

While aspects of the present disclosure have been particularly shown and described with reference to the examples above, it will be understood by those skilled in the art that various additional cases may be contemplated by the modification of the disclosed machines, systems and methods without departing from the spirit and scope of what is disclosed. Such cases should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. An electronic control module (ECM), comprising:
   one or more processors; and
   one or more computer-readable media storing computer-executable instructions that, when executed by the one or more processors, cause the one or more processors to:
      receive, via a control interface, a first input indicating that an autonomous machine is to be tested;
      activate, based at least in part on the first input, a test mode in which the autonomous machine is operable to perform one or more test actions;
      receive, via the control interface, a second input indicating a first test action to be performed, the first test action corresponding to an action to be performed by the autonomous machine according to a predetermined task plan;
      determine a plurality of operations required to be performed by one or more subsystems of the autonomous machine, in accordance with a performance sequence, in order to complete the first test action;
      identify a first subsystem ECM programmed to cause a first subsystem of the autonomous machine to perform a first operation of the plurality of operations in accordance with the performance sequence;
      generate a first instruction indicating the first operation to be performed by the first subsystem;
      provide the first instruction to the first subsystem ECM, wherein the first instruction causes the first subsystem ECM to control the first subsystem to perform the first operation based on the performance sequence;
      receive, from the first subsystem ECM, a message indicating whether the first operation was completed;
      determine, based at least in part on the message, whether the first test action was performed; and
      cause the control interface to display an indication of whether the first test action was performed.

2. The ECM of claim 1, wherein the computer-executable instructions, when executed by the one or more processors, cause the one or more processors to:
   determine a second subsystem ECM associated with the first test action;
   generate a second instruction indicating a second operation to be performed by the second subsystem ECM; and
   send the second instruction to the second subsystem ECM, wherein the second instruction causes the second subsystem ECM to perform the second operation.

3. The ECM of claim 1, wherein the first test action comprises a steering test action, the first subsystem ECM is a steering ECM, and the first instruction indicates one or more parameters describing the steering test action including a direction of steering.

4. The ECM of claim 1, wherein the computer-executable instructions, when executed by the one or more processors, cause the one or more processors to:
   receive, via the control interface, a third input indicating a second test action to be performed, the second test action including a second one or more operations;
   determine a second subsystem ECM associated with the second test action;
   generate a second instruction indicating a second operation of the second one or more operations to be performed by the second subsystem ECM; and
   send the second instruction to the second subsystem ECM, wherein the second instruction causes the second subsystem ECM to perform the second operation.

5. The ECM of claim 4, wherein the autonomous machine is a compactor, the second test action is a compaction test action, the second subsystem ECM is a compaction ECM, and the second instruction indicates at least one of: (i) an amplitude of vibration; or (ii) a frequency of vibration for the compaction test action.

6. The ECM of claim 1, wherein the first test action comprises a communications test action and the first instruction instructs the first subsystem ECM to respond with a response message.

7. The ECM of claim 6, wherein the computer-executable instructions, when executed by the one or more processors, cause the one or more processors to:
   determine that the response message has been received; and
   display, on the control interface, that communications with the first subsystem ECM is properly functioning.

8. The ECM of claim 1, wherein the control interface is disposed remote to the autonomous machine.

9. The ECM of claim 1, wherein providing the first instruction to the first subsystem ECM further comprises:
   receiving one or more sensor data;
   determining, based at least on the one or more sensor data, that the first test action avoids a collision; and
   providing the first instruction to the first subsystem ECM based at least in part on determining that the first test action avoids a collision.

10. A method for testing an autonomous machine, comprising:
    receiving, by a master electronic control module (ECM) and via a test interface displayed on a control interface, a first input indicating a first test action to be performed, the first test action corresponding to an action to be performed by an autonomous machine according to a predetermined task plan;

determining a plurality of operations required to be performed by one or more subsystems of the autonomous machine, in accordance with a performance sequence, in order to complete the first test action;

identifying a first subsystem ECM programmed to cause a first subsystem of the autonomous machine to perform a first operation of the plurality of operations in accordance with the performance sequence;

generating, by the master ECM, a first instruction indicating a first operation of the first one or more operations to be performed by the first subsystem;

receiving data from one or more sensors;

determining, based at least in part on the data from the one or more sensors, that the first test action avoids a collision;

sending, by the master ECM and to the first subsystem ECM, the first instruction, wherein the first instruction causes the first subsystem ECM to control the first subsystem to perform the first operation based on the performance sequence;

receiving, from one or more sensors, sensor data;

determining, based at least in part on the sensor data, whether the first test action was performed; and causing the control interface to display an indication of whether the first test action was performed.

11. The method for testing the autonomous machine of claim 10, further comprising:
  receiving, prior to the first input and via the control interface, a second input indicating that the autonomous machine is to be tested; and
  activating, based at least in part on the second input, the autonomous machine in a test mode in which the autonomous machine is operable to perform one or more test actions, the one or more test actions including the first test action.

12. The method for testing the autonomous machine of claim 10, wherein the first test action comprises a propulsion test action, the first subsystem ECM is a navigation ECM, and the first instruction indicates at least one of: (i) a direction of propulsion; (ii) a speed of propulsion; or (iii) a distance of propulsion.

13. The method for testing the autonomous machine of claim 10, wherein the determining that the first test action avoids a collision further comprises:
  receiving image data from a camera;
  analyzing the image data; and
  determining, based at least in part on analyzing the image data, that the first test action avoids any collisions with other objects.

14. The method for testing the autonomous machine of claim 10, wherein the control interface is disposed remote to the autonomous machine.

15. The method for testing the autonomous machine of claim 10, wherein the first test action comprises a communications test action and the first instruction instructs the first subsystem ECM to respond with a response message.

16. An autonomous machine, comprising:
a control interface;
a master electronic control module (ECM) configured to:
  receive, via the control interface, a first input indicating that the autonomous machine is to be tested;
  activate, based at least in part on the first input, a test mode in which the autonomous machine is operable to perform one or more test actions;
  receive, via the control interface, a second input indicating a first test action to be performed, the first test action corresponding to an action to be performed by the autonomous machine according to a predetermined task plan;
  determine a plurality of operations required to be performed by one or more subsystems of the autonomous machine, in accordance with a performance sequence, in order to complete the first test action
  determine a first subsystem ECM associated with the first test action;
  generate a first instruction indicating a first operation of the first one or more operations to be performed by the first subsystem;
  send the first instruction to the first subsystem ECM, wherein the first instruction causes the first subsystem ECM to control the first subsystems to perform the first operation based on the performance sequence;
  receive, from the first subsystem ECM, an indication of whether the first operation was completed;
  determine, based at least in part on the indication, whether the first test action was performed; and
  cause the control interface to display an indication of whether the first test action was performed, wherein:
the first subsystem ECM is configured to:
  receive the first instruction; and
  actuate, based at least in part on the first instruction, one or more mechanical devices to perform the first operation.

17. The autonomous machine of claim 16, further comprising:
  one or more sensors configured to send sensor data to the master ECM,
  wherein the master ECM is further configured to:
    analyze the sensor data to determine that performing the first test action results in the autonomous machine avoiding an avoidance zone, wherein the first instruction is sent to the first subsystem ECM based at least in part on determining that the first test action results in the autonomous machine avoiding the avoidance zone.

18. The autonomous machine of claim 17, wherein the one or more sensors comprise a camera, wherein the sensor data comprise image data from the camera.

19. The autonomous machine of claim 16, wherein the control interface is disposed remote to the autonomous machine.

20. The autonomous machine of claim 16, wherein the first test action comprises a communications test action and the first instruction instructs the first subsystem ECM to respond with a response message, and wherein the first subsystem ECM is configured to send the response message based at least in part on receiving the first instruction.

* * * * *